(12) United States Patent
Dalal

(10) Patent No.: US 10,144,341 B2
(45) Date of Patent: Dec. 4, 2018

(54) LOW BEAM INTENSITY CONTROL UNIT

(71) Applicant: Toyota Motor Engineering & Manufacturing North America, Inc., Erlanger, KY (US)

(72) Inventor: Sunil Dalal, Canton, MI (US)

(73) Assignee: Toyota Motor Engineering & Manufacturing North Ameria, Inc., Erlanger, KY (US)

( * ) Notice: Subject to any disclaimer, the term of this patent is extended or adjusted under 35 U.S.C. 154(b) by 0 days.

(21) Appl. No.: 15/268,673

(22) Filed: Sep. 19, 2016

(65) Prior Publication Data
US 2018/0079352 A1  Mar. 22, 2018

(51) Int. Cl.
*B60Q 9/00* (2006.01)
*B60Q 1/34* (2006.01)
*B60Q 1/14* (2006.01)
*H05B 33/08* (2006.01)
*H05B 37/02* (2006.01)
*B60Q 1/00* (2006.01)

(52) U.S. Cl.
CPC ......... *B60Q 1/1423* (2013.01); *B60Q 1/0076* (2013.01); *H05B 33/0854* (2013.01); *H05B 33/0884* (2013.01); *H05B 37/0218* (2013.01); *H05B 37/0227* (2013.01)

(58) Field of Classification Search
CPC . B60Q 9/00; B60Q 3/20; B60Q 9/008; B60Q 3/64; B60Q 1/045; B60Q 1/346; B60Q 9/007; B60Q 1/04; H05B 37/0227; H05B 37/0236; H05B 3/84; H05B 3/0014

USPC ............... 362/489, 505, 511, 154, 490, 507; 340/435, 439, 436, 575, 576, 903
See application file for complete search history.

(56) References Cited

U.S. PATENT DOCUMENTS

| 5,680,098 | A | 10/1997 | Bejster et al. |
| 6,281,631 | B1 | 8/2001 | Schaffer et al. |
| 6,281,632 | B1 | 8/2001 | Stam et al. |
| 2004/0240224 | A1 | 12/2004 | Chiang et al. |
| 2005/0134483 | A1 | 6/2005 | Monji et al. |

(Continued)

FOREIGN PATENT DOCUMENTS

CN         2493454 Y      5/2002

*Primary Examiner* — Wei Chan
(74) *Attorney, Agent, or Firm* — Dinsmore & Shohl, LLP

(57) ABSTRACT

A vehicular lighting system includes low beam headlamps, high beam headlamps and a control unit configured so that during operation of the lighting system, the control unit determines the operational status of the high beam headlamp and selectively adjusts the illuminating intensity of the low beam headlamp. In particular, the brightness of the low beam headlamp can be increased during periods where the high beam is not being, thereby allowing the low beam to more closely approximate the brightness of the high beam, but without the glare associated with conventional high beam patterns. In this way, artificially low illuminating intensity limitations placed on the low beam headlamps can be overcome during periods where the lighting system is operating but the high beams are not in use. In one preferred configuration, at least the low beam headlamps are made from numerous individual light-emitting diodes that can be separately controlled in order to achieve the adjustments in low beam headlamp illuminating intensity.

20 Claims, 2 Drawing Sheets

(56) References Cited

U.S. PATENT DOCUMENTS

| | | | |
|---|---|---|---|
| 2008/0158360 A1* | 7/2008 | Katou | B60Q 1/143 348/148 |
| 2009/0026958 A1* | 1/2009 | Kitagawa | B60Q 1/1423 315/77 |
| 2010/0052550 A1* | 3/2010 | Kobayashi | B60Q 1/143 315/158 |
| 2013/0141227 A1* | 6/2013 | Murata | B60K 28/10 340/438 |
| 2013/0169155 A1* | 7/2013 | Nakashima | B60Q 1/143 315/82 |

* cited by examiner

LOW BEAM INTENSITY CONTROL UNIT

TECHNICAL FIELD

The present disclosure generally relates to a lighting system for an automotive vehicle, and more particularly to a vehicular headlamp system that allows the low beam illuminating intensity to be selectively increased during system operational conditions where the high beams are not being used.

BACKGROUND

Motor vehicle headlamps typically include both a set of low beams for normal nighttime driving conditions and a set of high beams for such nighttime driving situations where the driver could benefit from additional forward-based illumination. In one common form, a single headlamp may include separate low beam and high beam filaments, while in another common form, separate headlamps each with their own dedicated filaments are provided. Regardless of the form, the beams are separately controlled in that the low beam filaments are energized in a low beam mode of operation while the high beam filaments are energized in a high beam mode of operation.

In older (i.e., on-off) headlamps, control of the (typically) tungsten-halogen filament operation included the use of relays and fuses, where one of the relays is used to energize the low beam filament at a predetermined maximum illuminating intensity, while another of the relays is used to energize the high beam filament, also at a maximum illuminating intensity. The fuses provide overcurrent protection for the filaments. These types of headlamps exhibit one of two modes, the first being completely off (i.e., no illumination) and the second being completely on that corresponds to complete illumination. It is difficult to dynamically change the luminance of these on-off configurations, as the relays do not respond to the type of continuous voltage supply needed to achieve graduated levels of illumination. Moreover, the fuses are prone to blowing and resulting in a non-operable headlamp until such time as the blown fuse can be replaced.

Furthermore, in situations where the high beams are activated in these on-off headlamp configurations, the low beams typically remain on as an additional illuminating source. Maximum illumination requirements (such as those imposed in the United States by the Federal Motor Vehicle Safety Standards (FMVSS, often referred to as FMVSS 108) often force the low beam illuminating intensity to be kept artificially low, even during periods of high beam inactivity. The FMVSS also includes provisions for the permissible height of vehicle headlamps, noting with specificity that such height is limited to between 0.559 meters and 1.372 meters. The problem of less-than-optimum low beam headlamp illumination is particularly acute in vehicles where the height of the headlamps is over 1 meter above the ground, such as those defined by truck, sport utility vehicle (SUV) and other enhanced-height vehicular platforms. As will be appreciated, many other countries, such as Japan and those in Europe, have adopted comparable rules and regulations to control the placement and illuminating intensities of vehicular lighting systems.

More recently, vehicular headlamps have been developed that provide the ability to deviate from a mere on-off functionality and instead have their illuminating intensity be adjustable; such a configuration is commonly referred to as a continuously variable headlamp or variable illumination headlamp. In one form of continuously variable headlamp, high intensity discharge (HID) headlamps (also referred to as xenon headlamps for the gas that is contained within the metal-halide lamps) use a voltage source that is passed through a ballast to both power the headlamps as well as provide a control signal to vary headlamp illumination intensity. In another form of continuously variable headlamp, the voltage from a voltage-modulated source passes through a high power field effect transistor (FET) or related headlamp driver circuit, where varying the duty cycle can cause a corresponding increase or decrease in the illumination intensity as needed. Such semiconductor-based switching operation of this latter form of continuously variable headlamp provides an increase in reliability over the conventional on-off headlamps discussed above. For example, and in addition to avoiding filament cycling problems, such solid-state switching reduces the need to have a fuse for each filament, which in turn eliminates fuse servicing requirements.

Regardless of the configuration, one problem associated with continuously variable headlamps and their control systems is the inability to adjust the illuminating intensity of the low beams in situations where enhanced range is desired. Accordingly, a need exists for an adjustable vehicular headlamp system and method for varying the light intensities of the low beam depending on the operational status of the high beam. A need likewise exists for providing greater illumination flexibility under a particular driving condition or environment to exploit the full illuminating capacity of the low beam headlamps while simultaneously remaining within the maximum guidelines established by the responsible transportation-related governmental body.

SUMMARY

In one embodiment, a vehicular lighting system includes one or more low beam headlamps, one or more high beam headlamps, a control unit and wiring cooperative with the low and high beam headlamps and control unit. Such a lighting system is configured so that the low beams are positioned to preferentially illuminate an area in front of a vehicle that is relatively close to the vehicle, while the high beams are positioned to preferentially illuminate an area in front of a vehicle that is relatively far from the vehicle. During operation of the lighting system, the control unit determines the operational status of the high beam headlamp (such as by sensing electric current being delivered through the wiring to the high beam headlamp, or by a camera-based sensor configured to detect whether high beam-based illumination in front of the vehicle is being provided) and sends out a control signal through the wiring to selectively adjust the illuminating intensity of the low beam headlamp based on such operational status. In one mode of operation, the brightness of the low beam filament can be increased during periods where the high beam is not being used as a way for the low beam to more closely approximate the brightness of the high beam headlamp, but without the glare associated with such high beam patterns. In this way, artificially low illuminating intensities—such as those imposed by governing laws, rules, regulations or the like—emanating from the low beam headlamps can be increased during periods where the lighting system is operating but the high beams are not in use. Of course, the maximum illuminating intensity of the low beam headlamps during these situations will remain within the limits set forth by such governing laws, rules, regulations or the like. Thus, the low beam headlamps can take advantage of a maximum illuminating intensity permitted within the jurisdiction in which a vehicle incorporating the lighting system is operating.

In another embodiment, a vehicle includes a wheeled chassis defining a passenger compartment therein, a motive power unit, a guidance apparatus cooperative with the wheeled chassis and motive power unit and a lighting system. The lighting system includes one or more low beam headlamps, one or more high beam headlamps, a control unit and wiring to convey one current to the headlamps based on a control signal generated by the control unit. In an optional form, the vehicle may be outfitted with additional sensors configured to detect ambient lighting conditions; signals generated based on images acquired by these sensors may be conveyed to the control unit in order to help logic contained within to determine additional input parameters that may be further used to control the operation of the headlamps.

In still another embodiment, a method of operating vehicular headlamps is disclosed. The method includes operating a lighting system control unit along with one or more of a low beam headlamp and a high beam headlamp to illuminate a region in front of a vehicle. At least the low beam headlamp is capable of operating with adjustable illuminating intensity. In addition, the method includes increasing the illuminating intensity of the low beam headlamps based on instructions from the control unit in situations where the high beam headlamps are not illuminating the region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to headlamp systems for vehicles that have at least one low beam headlamp with variable intensity and at least one high beam headlamp. Through the operation of a control unit in cooperation with variable illumination headlamps, the illuminating intensity of the low beam headlamps may be selectively increased during periods where the high beam headlamp is not operating so that additional illumination range is possible. For example, in nighttime driving situations where it is not appropriate to use the high beams (such as when there is fog in the ambient environment, or when the vehicle encounters oncoming traffic or the rearview mirrors of leading vehicles traveling in the same direction), the high beams are either turned off by the driver of the vehicle (in the case of manual switching) or turned off automatically (in the case of switching being performed by the control unit) so that the low beam illuminating intensity can be increased in order to (within legal limits) provide an enhanced amount of lighting in the region of interest forward of the vehicle.

Figure 1:
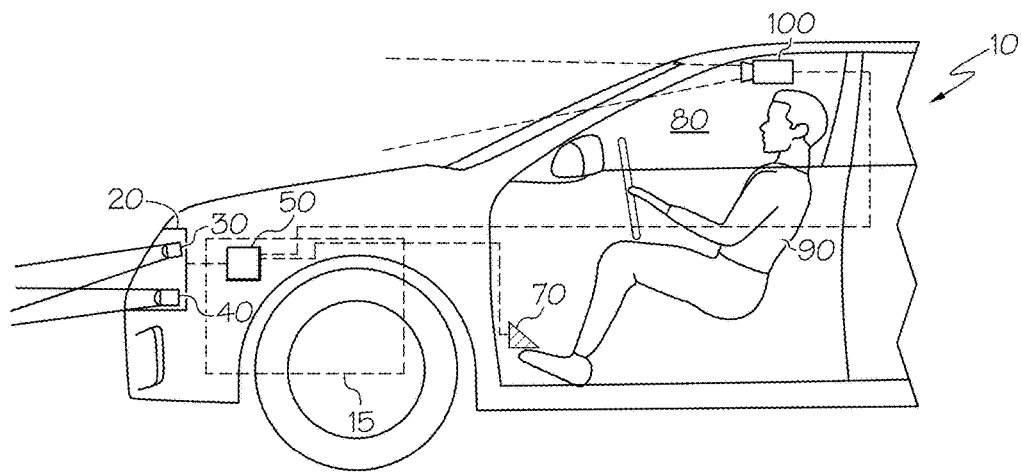
FIG. 1 depicts a partial side elevation view of a vehicle with a headlamp system according to one embodiment as described herein.

Referring first to FIG. 1, a vehicle 10 is generally shown. Vehicle 10 includes a wheeled chassis, an engine (such as an internal combustion engine (ICE), fuel cell stack, electric motor or combination thereof) to serve as a motive power unit 15, and a guidance apparatus including accelerator, brakes, steering, transmission and related components that are cooperative with the wheeled chassis and motive power unit 15 to propel and control the vehicle 10 on a driving surface. In addition, vehicle 10 includes a lighting system 20 to facilitate nighttime operation. Lighting system 20 is made up of low beam headlamps 30, high beam headlamps 40, control unit 50 and one or more wiring harnesses 60. As can be seen, the low beam headlamps 30 are preferentially pointed downward to illuminate a region in that is relatively close to the front of the vehicle 10, while the high beam headlamps 40 are preferentially pointed in a more horizontal orientation to illuminate a region in that is relatively far in front of the vehicle 10. In general, the high beam headlamp 40 is capable of generating a higher illuminating intensity than the low beam head lamp 30.

The control unit 50 is responsive to a switch 70 that is situated within the passenger compartment 80 to allow the driver 90 to determine which of the low beam headlamps 30 or high beam headlamps 40 should be made operational. It will be understood that switch 70 may control the operation of other lights (not shown) within the system 20, such as rear lights, daytime running lights, fog lights or the like. As will be further appreciated, in one form, the low beam headlamps 30 and high beam headlamps 40 are substantially symmetrically placed relative to the centerline on the right and left side of the vehicle 10, although vehicle 10 may contain different arrangements of these lamps. It will likewise be appreciated that for other vehicular configurations such as motorcycles, the need for opposing right-side and left-side lights may be dispensed with, and that these and other headlamp variants are all within the scope of the present disclosure.

Figure 2:
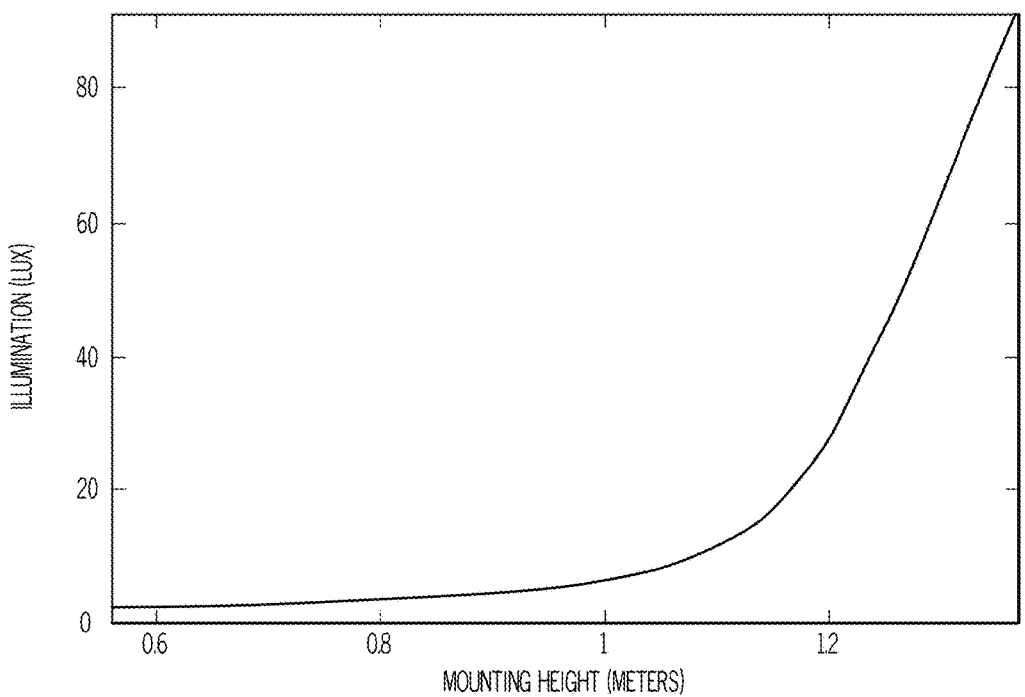
FIG. 2 is a graph depicting the amount of illumination imparted to the driver of a vehicle as a function of the mounting height of another vehicle's low-beam headlamps.

Referring next to FIG. 2, illumination from low beam headlamps 30 from adjacent vehicles (either as oncoming direct line-of-sight view or from behind in the form of reflections off of a sideview or rearview mirror mounted onto vehicle 10) can become a significant source of glare or related distraction to driver 90, especially in headlamp mounting situations of the other vehicle that are farther from the ground. In particular, the graph illustrates the permissible low-beam headlamp 30 mounting height range in the United States of between 0.559 meters and 1.372 meters as dictated by FMVSS 108. Notably, typical passenger cars (such as vehicle 10 in FIG. 1) have headlamps mounted at about 0.62 meters above the road surface, while SUVs, trucks and other higher-center-of-gravity vehicles (not shown) may have mounting heights of between 1.0 meters and up to the maximum 1,372 meters. As can be seen, the illumination present in the eyes of driver 90 from of the glare of an oncoming or rearwardly-approaching other vehicle is roughly 2 lux when the other mounting height of the low beam headlamps of the other vehicle is between 0.6 and 0.62 meters, whereas for an oncoming or rearwardly-approaching other vehicle with headlamps mounted at 1 meter, the illumination imparted to the eyes of driver 90 of vehicle 10 increases to about 6 lux, and becomes significantly greater when the forwardly-approaching or rearwardly-approaching vehicle has a low beam headlamp mounting height higher than 1 meter, peaking out at roughly 90 lux at the upper limit of FMVSS 108-permissible mounting heights. This large (and highly nonlinear) increase is due to the fact that the intensity of low beam headlamp 30 is greatest at about 1.5 degrees below the horizontal line and decreases rapidly with increased vertical angle.

As mentioned above, to avoid the difficulty associated with increased low beam headlamp 30 illumination to another driver, automobile manufacturers or headlamp manufacturers have decreased the maximum amount of illumination intensity the low beam headlamp 30 puts out during periods of operation where the high beam headlamps 40 are not being used. Such intentional reduction in illumination is generally perceived to be less detrimental to overall lighting system 20 operation than trying to aim vehicular headlamps (especially those of larger vehicles with their concomitant higher headlamp mounting) in a more downward angle in that the latter unduly limits illumination range during normal driving. Both of these difficulties can be overcome for illuminating driving situations by the system of the present disclosure.

Figure 3:
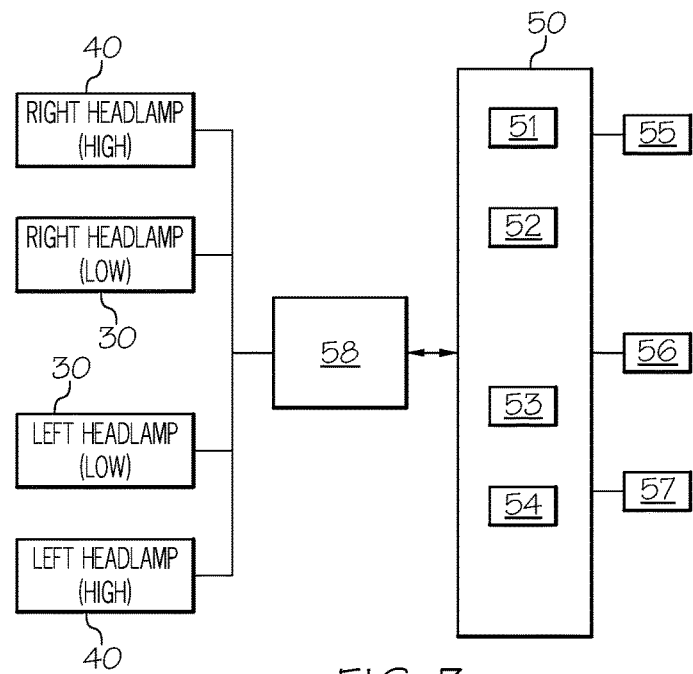
FIG. 3 depicts the headlamp system of FIG. 1 in block diagram form.

Referring next to FIG. 3, a block diagram depicting the interconnection of the various components that make up the lighting system 20 is shown. As can be seen, the control unit 50 forms the central component through which most or all of the components interact. Control unit 50 may be configured as an electronic control unit (ECU) that has well-known von Neumann computer system architecture attributes to enable it to perform one or more specific automated steps outlined in this disclosure. For example, control unit 50 preferably includes processor 51, memory 52, input 53 and output 54. These various components are presently depicted as being signally-coupled function blocks that are shown separately for illustration purposes, although it will be appreciated that these blocks may also be structurally configured to define one or more components in or around the processor 51 such that they are a part of the internal functioning of the processor 51 itself. For example, in one form, the control unit 50 may be constructed as a microcontroller where the processor 51, memory 52, input 53 and output 54 are integrally formed on a single chip to controls the generation of a pulse width modulated (PWM) drive signal for the lighting system 20. With the inclusion of appropriate logic, the control unit 50 may be programmed to provide various control functions as is known in the art.

In one form, memory 52 for the storage of software and gathered data may include static memory such as read-only memory (ROM) and dynamic memory such as random access memory (RAM) and their variants. In one exemplary form, the vehicle manufacturer or headlamp manufacturer may store minimum and maximum values of low beam headlamp 30 luminance in ROM for access by processor 51. In this way, the voltage being delivered (such as by a pulse width modulator 56) to provide illuminating power to the headlamps 30 ensures that neither lower nor upper levels of permissible brightness levels are exceeded. The input 53 may include various voltage sources for control unit 50 power, as well as signal inputs from various sensors (described later) and switch 70. Likewise, the output 54 may include control logic, as well as steady or varying voltages such as that required to provide current to the filaments that reside within the low beam headlamps 30 and high beam headlamps 40. As such, the use of the control unit 50 in the manner set forth herein permits it to become a particularly-adapted computer or computer-related data processing device for performing at least some of the low beam 30 headlamp and high beam headlamp 40 control discussed herein. It will be appreciated by those skilled in the art that computer-executable instructions that embody operations discussed elsewhere in this disclosure can be placed within an appropriate location (such as the aforementioned memory 52) within control unit 50 in order to achieve the objectives set forth in the present disclosure.

Additional components are also placed in cooperation with the processor 51 in order to facilitate operation of control unit 50; these may include a power supply 55, the aforementioned pulse width modulator 56, a multiplexer 57 and one or more current detectors 58 and indicators 59, all of which may be interconnected through a bus (not shown) or related wiring. In particular, pulse width modulator 56 is used to deliver the degree of PWM needed to ensure the desired level of illuminating intensity coming from the low beam headlamp 30. Multiplexer 57 permits current data from the headlamps, 30, 40 to be input to the processor 51. Likewise, current detector 58 provides the processor 51 with feedback as to the operational status of the lamps 30, 40. More particularly, the current detector 58 can provide open circuit detection and short circuit detection of the circuit associated with the high beam headlamp 40 to the processor 51. The current detector 58 may also sense when communication with the multiplexer 57 has been lost (such as by a loose or severed wire) so that in such circumstance, the current detector 58 may instruct a backup circuit (not shown) in order to illuminate the headlamps 30, 40. Likewise, power supply 55 (typically around 12 volts DC) is used to provide electrical current to the processor 51, the lamps 30, 40 and a host of other current-consuming components that make up the lighting system 20. Furthermore, the indicator 59 is typically in the form of a visual or audible warning that may be situated within the passenger compartment 80 in a manner suitable to alert the driver 90 as to the operational status of the lamps 30, 40. In one form, the indicator 59 may be used to indicate whether one or the other of the low beam headlamps 30 and high beam headlamps 40 are being used to illuminate a region in front of the vehicle 10. Furthermore, the multiplexer provides a communication link with each of the low beam headlamps 30 and high beam headlamps 40; this is particularly useful in configurations where the lamps use solid-state switching devices in the form of light-emitting diodes (LEDs) that are discussed in more detail below. As such, in one preferred form, the control unit 50 can deliver a pulsed power source as a way to energize the lighting system 20. By delivering pulsed power, the filaments in the low beam headlamps 30 and high beam headlamps 40 can desirably be fed a constant RMS voltage.

Referring again to FIG. 1, one or more sensors may be mounted in or on vehicle 10 as part of one or more data-gathering activities that may be needed for operation of system 20. One such sensor may be in the form of an optical sensor, such as a camera 100 that is mounted near the roof to define a field of view and light axis that extends forward and downward relative to the vehicle 10. For example, the camera 100 makes it possible to acquire images of the region in front of the vehicle 10 that can then be sent and analyzed by an image sensor (not shown) that is signally cooperative with processor 51. In exemplary form, the camera 100 is configured as a solid-state imaging device, such as a charge coupled device (CCD), or a complementary metal oxide semiconductor (CMOS). In circumstances where the acquired image is in analog form (such as pixel gray scale levels or the like), the control unit 50 may be equipped with an analog-to-digital converter (not shown) so that the processor 51 can receive digitized image data from the analog-to-digital converter as additional parametric data.

Either the camera 100 or the current detector 58 are particularly useful for promoting the automated operation of the lighting system 20, as either current-based or visual-based indicia of the non-use of the high beam headlamp 40 may be used by the control unit 50 as input to determine when to increase the illumination of the low beam headlamps 30. More significantly, the camera 100 or other sensors (not shown) may be used along with the control unit 50 to provide the precise amount of low beam headlamp 30 illuminating intensity that is required for a particular operating environment. For example, if the local environment in which vehicle 10 is operating is extremely dark (such as driving on an isolated road with little or no streetlights or other ambient source of illumination), the control unit 50 may need to deliver a larger PWM voltage to the low beam headlamps 30 than if the same vehicle 10 were situated in a more well-lit environment, such as that where streetlamps or other vehicles are present, as well as during a time of day (such as dawn or dusk) where there may still be respective increasing or residual ambient lighting. In such case, light-detecting sensors may be made to signally cooperative with the control unit 50 such as by having their sensed data compared to mathematical quantities representative of these particular operating environments. In one form, the representative mathematical quantities may be in the form of an equation or algorithm that can be operated upon by processor 51, while in another they can be provided by a lookup table that can be stored in memory 52.

The lighting system 20 disclosed herein is particularly well-suited for use with low beam headlamps 30 and high beam headlamps 40 that are configured as LEDs. One particular benefit of an LED-based headlamp configuration is that rather than having a single filament (such as that associated with conventional on-off incandescent tungsten-halogen lamps, as well as those of an HID lamp), it can be made from an array or matrix of small, discreet diodes, each controllable independent of the others. Such LED designs are a form of solid state lighting where once a threshold voltage that exceeds a forward voltage is met, the LED begins to illuminate. Current-limiting resistor are used to compensate for the constant voltage load-like behavior of the LEDs to keep the LEDs from being damaged, as otherwise a forward current may increase continuously when impedance from the source is low.

Further, the luminance coming from LEDs that make up the low beam headlamps 30 and high beam headlamps 40 can be easily controlled by reducing the duty (i.e., the proportion of time relative to a set period where the power is being applied) of a pulse-width modulation (PWM) signal from the control unit 50. This is especially beneficial in that each LED from a group, matrix or cluster can be separately controlled, which in turn allows close-tolerance control of the illuminating intensity being created by lighting system 20. As construed herein, the term "continuously variable architecture" is meant to include LED-based and related headlamp configurations where one or more individual lighting elements that make up the headlamp can be either (a) individually controlled to be on or off, (b) responsive to the supply voltage provided to them be adjusted in such a way that the illuminating intensity is related to the applied voltage or (c) both. Regardless of which of the above approaches is used to achieve the desired level of illumination, the continuously variable architecture ensures that a substantially continuous range of illuminating intensities emanating from the headlamp is possible. In one form, the PWM signal can be adjusted by the frequency with which the power supply from the battery or other source is being operated. A PWM signal generation unit (in the form of pulse width modulator 56 as discussed above) is used in cooperation with (or as part of) the control unit 50 to drive a switching element as a way to convert the direct current voltage of the source to the suitable PWM signal.

Thus, in circumstances where it is determined that the high beam headlamps 40 are not being used, the luminance of the low beam headlamps 30 may be increased tough a larger PWM signal duty cycle being delivered to the various LEDs contained within the low beam headlamps 30. An LED-based version of the lighting system 20 is additionally beneficial in that the ways the luminance of the low beam headlamps 30 can be selectively adjusted is by turning on or off some of the LEDs, as needed.

In operation of the lighting system 20, switching the headlamps 30, 40 to an "on" position can be initiated by the driver 90 by selecting the appropriate position with switch 70. In another mode, the operation of the lighting system 20 can be automated, such as through the operation of a camera, electronic eye or related sensor that is tuned to detect a lighting level in the region of interest to the lighting system 20. Regardless of how the initial lighting system 20 operation takes effect, when either current detector 58 or the camera 100 senses a non-operation of the high beam headlamps 40, processor 51 determines an amount by which the PWM 56 being delivered to the low beam headlamp 30 may be increased in order increase the illuminating range of vehicle 10 while remaining within legal limits (such as those established by FMVSS 108). Once that determination has been made, processor 51 retrieves the corresponding control signal information from memory 52 in order to ensure that the proper duty cycle of the low beam headlamps is being delivered. Furthermore, the processor 51 may be used in conjunction with indicator 58 in order to provide information to the driver 90.

Thus, the wiring harness 60 is coupled to the low and high beam headlamps 30, 40 and control unit 50 such that during operation of the lighting system 20, the control unit 50 determines the operational status of the high beam headlamp 40 and sends out a control signal through the wiring harness 60 to selectively adjust the illuminating intensity of the low beam headlamp 30 based on such operational status. In particular, when it is determined that the operational status of the high beam headlamps 40 is being maintained in their "off" position (or otherwise are not operating despite having the high beam portion of the wiring being engaged), the control unit 50 sends an appropriate signal through the low beam portion of the wiring harness 60 to increase the illuminating intensity of the low beam headlamps 30.

As mentioned above, a determination of whether the high beam headlamps 40 are on may be made by the control unit 50, such as by measuring for an open circuit or short circuit condition in the portion of the wiring harness that corresponds to the high beam headlamps 40. Thus, when control unit 50 determines that the high beam headlamps 40 are not operational, processor 51 reconfigures the PWM through the pulse width modulator 56 to increase the current being delivered to the low beam headlamp 30. Memory 52 (for example, in ROM, as mentioned above) is used to store the information for each lamp 30, 40, including information related to their duty cycle. Processor 51 sends signals via multiplexer 57 to each of the lamps 30, 40 based on the input from switch 70 that determines which of the lamps 30, 40 should be illuminated. As indicated above, in addition to (or in place of) switch 70, the lighting system 20 may include automated features to have one or both of sets of headlamps 30, 40 to illuminate in certain ambient environment lighting conditions.

Figure 4:
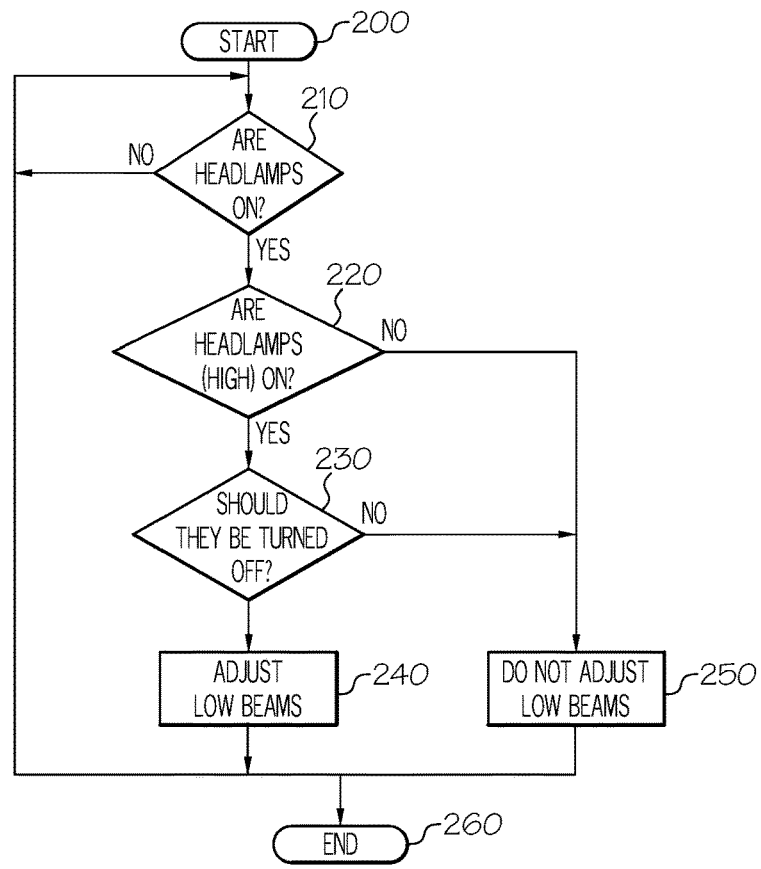
FIG. 4 depicts a simplified flowchart showing the steps of adjusting a vehicle's low beam headlamps according to one embodiment as described herein.

Referring next to FIG. 4 in conjunction with FIGS. 1 and 3, during normal operation of the lighting system 20 that has been started at step 200 either by operation of the driver 90 on the switch 70 or automated operation of the system 20, the control unit 50 may ascertain at step 210 whether the headlamps 30, 40 are turned on. If the headlamps 30, 40 are not turned on, then the logic terminates the inquiry by proceeding to the end step 260. Contrarily, if the inquiry at step 210 is satisfied, it proceeds to step 220 to determine if the high beam headlamps 40 are turned on. In one form (as mentioned above), the inquiry at step 210 may be determined by checking with the current detector 58, or by independent light sensing from camera 100. If the high beam headlamps 40 are not turned on, then the logic proceeds to step 250 to advise the control unit 50 to not adjust the illuminating intensity of the low beam headlamps 30, and then on to terminating step 260. Contrarily, if the inquiry at step 220 is satisfied, it proceeds to step 230 to determine if the high beam headlamps 40 should be turned off. In situations where the high beam headlamps 40 should be disengaged, the logic proceeds to the next step 240 to instruct the control unit 50 to send an appropriate signal to the low beam headlamps 30 to increase their illumination. In one form, the camera 100 or related sensor may be used to ascertain ambient lighting conditions, while in another, a different sensor (such as a motion sensor, not shown) may be used to determined a distance between vehicle 10 and oncoming or leading vehicles. All such sensors and their operability are known in the art, and as such may be coupled to the control unit 50 to provide an enhanced level of lighting system 20 operability through comparison to illumination parameters (such as those stored in memory 52 as either algorithms, lookup tables or the like) to more precisely vary the amount of additional low beam headlamp 30 illumination. In this way, not only can the illuminating intensity emanating from the low beam headlamps 30 be increased to a maximum permissible level, but such level can be automatically changed as ambient lighting needs change. This in turn permits the low beam headlamps to provide as much forward lighting as possible while keeping the amount of eye exposure to the drivers of other vehicles within acceptable limits.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular lighting system comprising:
   at least one low beam headlamp;
   at least one high beam headlamp;
   a control unit defining at least one processor and memory therein such that the control unit is configured to deliver a pulsed power source as a way to energize the low beam headlamp and high beam headlamp with a predetermined illuminating intensity, the control unit comprising:
   a pulse width modulator connected to the processor to deliver a level of the illuminating intensity to the low beam headlamp; and
   a multiplexer connected to at least one of the pulse width modulator and the processor to provide a communication link with each of the low beam headlamp and the high beam headlamp; and
   a wiring connected to the low and high beam headlamps and the control unit such that during operation of the lighting system, the control unit automatically determines the operational status of the high beam headlamp based on a signal from a sensor and automatically sends out a control signal through the wiring to selectively adjust the illuminating intensity of the low beam headlamp when such operational status of the high beam headlamp is determined to be off.

2. The lighting system of claim 1, wherein the control unit is configured to increase the illuminating intensity of the low beam headlamp when the operational status of the high beam headlamp is off.

3. The lighting system of claim 2, wherein at least the low beam headlamp defines a continuously variable architecture.

4. The lighting system of claim 3, wherein the continuously variable architecture comprises a plurality of light-emitting diodes disposed within each low beam headlamp.

5. The lighting system of claim 4, wherein each of the plurality of light-emitting diodes are individually adjustable through the control unit.

6. The lighting system of claim 5, wherein each individual light-emitting diode of the plurality of light-emitting diodes is adjustable through the duty cycle of a pulse width modulated signal that is delivered from the control unit to the low beam headlamp.

7. The lighting system of claim 3, wherein the control unit is configured to increase in illuminating intensity through adjustment of the duty cycle of a pulse width modulated signal that is delivered from the control unit to the low beam headlamp.

8. The lighting system of claim 3, wherein the control unit is configured to increase in illuminating intensity by selectively illuminating a larger portion of the plurality of light-emitting diodes than when both the low beam headlamp and the high beam headlamp are being illuminated.

9. The lighting system of claim 2, wherein the control unit is configured to the increase in illuminating intensity up to a maximum illuminating intensity.

10. The lighting system of claim 1, wherein the sensor is connected to the control unit such that the operation of the control unit automatically determines that the operational status of the high beam headlamp takes place based the signal received from the sensor.

11. A vehicle comprising:
    a wheeled chassis defining a passenger compartment therein;
    a motive power unit;
    a guidance apparatus connected to the wheeled chassis and motive power unit; and a lighting system comprising
at least one low beam headlamp;
at least one high beam headlamp;
a control unit defining at least one processor and memory therein such that the control unit is configured to deliver a pulsed power source as a way to energize the low beam headlamp and high beam headlamp with a predetermined illuminating intensity, the control unit comprising:
a pulse width modulator connected to the processor to deliver a level of the illuminating intensity to the low beam headlamp: and a multiplexer connected to at least one of the pulse width modulator and the processor to provide a communication link with each of the low beam headlamp and high beam headlamp; and
a wiring connected to the low and high beam headlamps and control unit such that during operation of the lighting system, the control unit automatically determines the operational status of the high beam headlamp based on a signal from a sensor and automatically sends out a control signal through the wiring to selectively adjust the illuminating intensity of the low beam headlamp when such operational status of the high beam headlamp is determined to be off.

12. The vehicle of claim 11, wherein each low beam headlamp comprises a plurality of light-emitting diodes.

13. The vehicle of claim 12, wherein the control unit is configured to increase in illuminating intensity of the low beam headlamp through adjustment of the duty cycle of a pulse width modulated signal that is delivered from the control unit to the light-emitting diodes.

14. The vehicle of claim 12, wherein the control unit is configured to increase in illuminating intensity is provided by selectively illuminating a larger portion of the plurality of light-emitting diodes than when both the low beam headlamp and the high beam headlamp are being illuminated.

15. The vehicle of claim 12, wherein the control unit is configured to the increase in illuminating intensity up to a maximum illuminating intensity.

16. The vehicle of claim 12, further comprising the sensor connected to the control unit such that the operation of the control unit to automatically determine the operational status of the high beam headlamp takes place based the signal received from the sensor.

17. A method of automatically operating vehicular headlamps with a lighting system, the method comprising:
operating a control unit that makes up a portion of the lighting system to illuminate a region in front of a vehicle with at least one of a low beam headlamp and a high beam headlamp wherein the at least one low beam headlamp is configured to operate with adjustable illuminating intensity, the control unit defining at least one processor and memory therein such that the control unit is configured to deliver a pulsed power source as a way to energize the low beam headlamp and high beam headlamp with a predetermined illuminating intensity, the control unit comprising:
a pulse width modulator connected to the processor to deliver a level of the illuminating intensity to the low beam headlamp: and
a multiplexer connected to at least one of the pulse width modulator and the processor to provide a communication link with each of the low beam headlamp and high beam headlamp;
automatically receiving a signal from a sensor to determine an operational status of the high beam headlamp; and
automatically increasing the illuminating intensity of the low beam headlamp based on instructions from the control unit in situations where the high beam headlamp is not illuminating the region.

18. The method of claim 17, wherein each low beam headlamp comprises a plurality of light-emitting diodes.

19. The method of claim 18, wherein the control unit is configured to adjust the duty cycle of a pulse width modulated signal that is delivered to the low beam headlamp.

20. The method of claim 18, wherein the control unit is configured to increase in illuminating intensity up to a maximum illuminating intensity.

* * * * *

UNITED STATES PATENT AND TRADEMARK OFFICE
CERTIFICATE OF CORRECTION

PATENT NO. : 10,144,341 B2
APPLICATION NO. : 15/268673
DATED : December 4, 2018
INVENTOR(S) : Sunil Dalal Page 1 of 1

It is certified that error appears in the above-identified patent and that said Letters Patent is hereby corrected as shown below:

On the Title Page

Item (73), Assignee, delete "Toyota Motor Engineering & Manufacturing North Ameria, Inc." and insert --Toyota Motor Engineering & Manufacturing North America, Inc.--, therefor.

Signed and Sealed this
Twelfth Day of February, 2019

Andrei Iancu
*Director of the United States Patent and Trademark Office*